(12) United States Patent
Inserra Imparato et al.

(10) Patent No.: US 8,419,875 B2
(45) Date of Patent: Apr. 16, 2013

(54) METHOD OF MANUFACTURING A CURVED STRUCTURAL ELEMENT MADE OF COMPOSITE MATERIAL AND HAVING A COMPLEX, OPEN CROSS-SECTION

(75) Inventors: Sabato Inserra Imparato, Gragnano (IT); Vincenzo De Vita, Andria (IT); Gianni Iagulli, San Severo (IT); Luca Di Tommaso, Marano di Napoli (IT)

(73) Assignee: Alenia Aeronautica S.p.A., Pomigliano D'Arco, Napoli (IT)

( * ) Notice: Subject to any disclaimer, the term of this patent is extended or adjusted under 35 U.S.C. 154(b) by 530 days.

(21) Appl. No.: 12/678,258

(22) PCT Filed: Sep. 17, 2008

(86) PCT No.: PCT/IB2008/053765
§ 371 (c)(1),
(2), (4) Date: Mar. 15, 2010

(87) PCT Pub. No.: WO2009/037647
PCT Pub. Date: Mar. 26, 2009

(65) Prior Publication Data
US 2011/0259508 A1    Oct. 27, 2011

(30) Foreign Application Priority Data
Sep. 20, 2007   (IT) .............................. TO2007A0659

(51) Int. Cl.
*B29C 70/34* (2006.01)
(52) U.S. Cl.
USPC ............................ 156/182; 156/196; 156/214
(58) Field of Classification Search ........................ None
See application file for complete search history.

(56) References Cited

U.S. PATENT DOCUMENTS

| | | | |
|---|---|---|---|
| 5,171,510 A | 12/1992 | Barquet et al. | |
| 5,366,684 A * | 11/1994 | Corneau, Jr. | 264/510 |
| 6,730,184 B2 * | 5/2004 | Kondo et al. | 156/221 |
| 2007/0161483 A1 * | 7/2007 | Raf | 493/296 |
| 2009/0123708 A1 * | 5/2009 | Depase et al. | 428/178 |

FOREIGN PATENT DOCUMENTS

| | | |
|---|---|---|
| EP | 1 800 840 A1 | 6/2007 |
| IT | TO2007A000557 | 7/2007 |
| WO | WO 2009/016552 A2 | 2/2009 |

OTHER PUBLICATIONS

Musch et al. "Tooling with reinforced elastomeric materials." *Composites Manufacturing*, vol. 3, No. 2, 1992, pp. 101-111.

* cited by examiner

*Primary Examiner* — Barbara J. Musser
(74) *Attorney, Agent, or Firm* — Merchant & Gould P.C.

(57) ABSTRACT

A method of manufacturing a curved structural element made of composite material has a complex, open cross-section the structural element is formed by the assembly of components made of composite material. A plurality of flat, fresh components are prepared, each component being constituted by a flat layer of curved fibres previously infused with resin, combined with a pre-impregnated layer with straight fibres. Hot-forming of the flat, raw components is then performed. The hot-formed, fresh components are then assembled in accordance with a predetermined sequence on a polymerization tool. The tool includes a shaped, inflatable device astride which a C-shaped raw component is deposited. Finally, the fresh components assembled on the tool are subjected to a polymerization cycle in an autoclave. The inflatable device is inflated by the pressure produced in the autoclave to apply a predetermined pressure from the inside of the C-shaped fresh component.

7 Claims, 6 Drawing Sheets

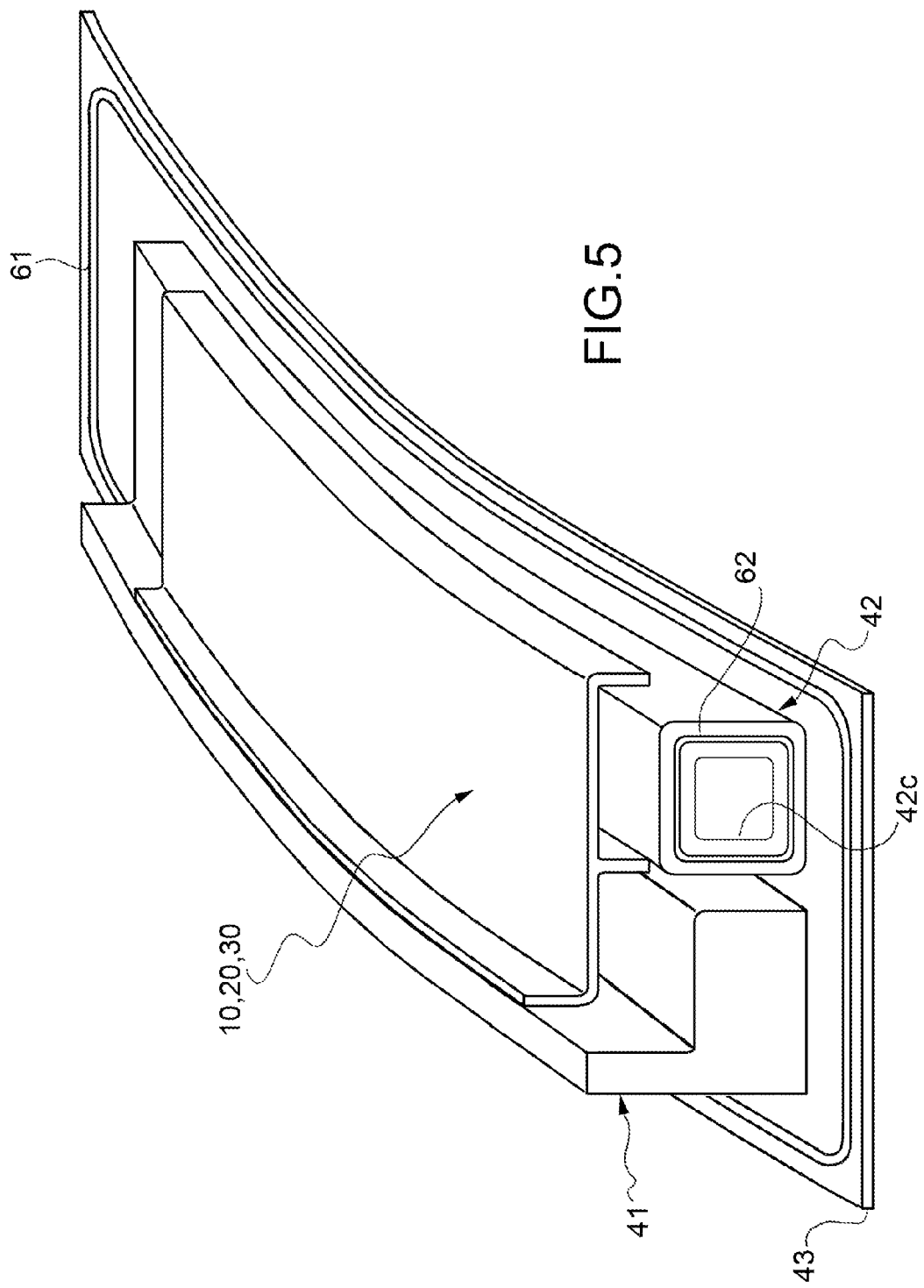

METHOD OF MANUFACTURING A CURVED STRUCTURAL ELEMENT MADE OF COMPOSITE MATERIAL AND HAVING A COMPLEX, OPEN CROSS-SECTION

This application is a National Stage Application of PCT/IB32008/053765, filed 17 Sep. 2008, which claims benefit of Serial No. TO2007A000659, filed 20 Sep. 2007 in Italy and which applications are incorporated herein by reference. To the extent appropriate, a claim of priority is made to each of the above disclosed applications.

FIELD OF THE INVENTION

The present invention relates to a method of manufacturing a curved structural element made of composite material and having an open cross-section.

BACKGROUND OF THE INVENTION

The need to reduce weight and eliminate corrosion problems has led the aeronautical industry to make commercial aircraft fuselages of composite material.

Of particular importance amongst the structural elements which make up the fuselage are the circumferential frames which are connected to the outer skin by means of another structural element called a shear tie, stabilizing the outer skin and giving it the strength to resist flight and pressurization loads.

The current technology provides for various processes for manufacturing the composite frames and shear ties separately. They are then riveted together and then to the outer skin to create the final assembly.

A particularly advanced technique, however, is to produce the integral frame and shear-tie assembly as a single component so as to be able to reduce its weight (the absence of riveting enables thicknesses to be reduced in the joining regions and the weight of the connecting members is avoided) as well as costs and flow times.

Up to now, the production of integral frames and shear ties has been achieved by a resin-transfer moulding process (RTM) which enables dry carbon-fibre reinforcement preforms to be infused with resin; the preforms are produced from dry, unidirectional fabric layers which are preassembled and positioned in the infusion and curing mould.

This process has the following disadvantages:
to enable the resin to flow in the RTM process, it is necessary to use very fluid resins which, however, cannot contain within them the toughening elements that are necessary to improve their properties, such as compression after impact or low inflammability; an alternative is to use resins the toughening of which is woven into the preform and then dissolves in the resin at the time of infusion; however, this process makes the production of the preform more complex and expensive;
the materials used for the reinforcement have straight fibres which are unsuitable for producing curved structural elements; in fact their forced adaptation to curved shapes causes uncontrolled wrinkles and/or distortions of the orientations of the fibres, resulting in unreliability of the mechanical properties;
structural optimization often requires the circumferential reinforcing elements to have a certain percentage of reinforcing fibres that are arranged in a curved manner; this requirement cannot be satisfied with the reinforcements that are used in the current state of the art;
the tools for RTM are complex to assemble, to hold in position with the necessary accuracy during the injection of resin, and to disassemble after polymerization, and are difficult to clean and maintain.

SUMMARY OF THE INVENTION

The object of the present invention is therefore to provide a method of manufacturing curved structural elements such as integral frame/shear-tie combinations which eliminates or at least reduces the disadvantages of the prior art.

This object is achieved, according to the invention, by a method of manufacturing a curved structural element made of composite material and having a complex, open cross-section.

The principle of tooling in conjunction with preforms pre-infused in a flat arrangement and having curved reinforcing fibres permits the production of complex components made of composite material such as frames, shear ties or combinations of the two with curved reinforcing fibres, eliminating the risk of wrinkles or interruptions of fibres.

Moreover, the process described permits the use of resins that are toughened and flame-resistant owing to their highly viscous nature.

The tooling concept with respect to the inflatable device allows a uniform pressure to be applied to the component even when there are variations in thickness, variations in profile (joggles), etc., which cannot be achieved with conventional, rigid tools. This permits the production of components that are free of structurally unacceptable adhesion defects, voids and porosity.

The method according to the invention can be used for curved structural components in the naval, railway, and building fields etc., as well as in the aeronautical field.

BRIEF DESCRIPTION OF THE DRAWINGS

Some preferred but non-limiting embodiments of the invention will now be described with reference to the appended drawings, in which.

DETAILED DESCRIPTION OF THE PREFERRED EMBODIMENTS

Figure 1:
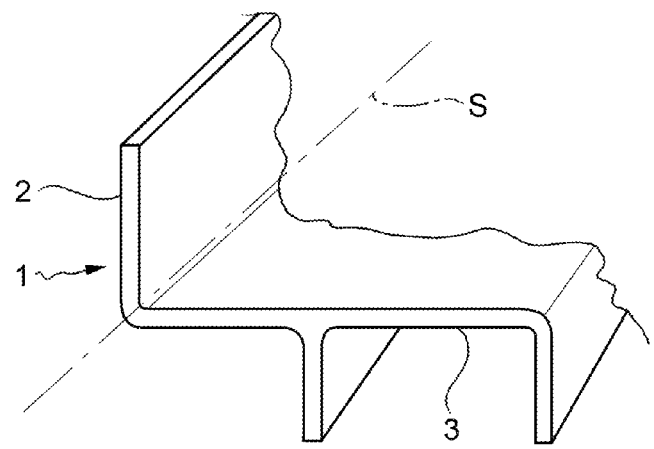
FIG. 1 is a partial perspective view of a curved structural element made of composite material and having a complex, open cross-section, in particular, a frame/shear-tie unit.

FIG. 1 shows a curved structural element 1 made of composite material and having a complex, open cross-section, in particular a one-piece unit formed by the combination of a frame and a shear tie. In the drawing, the portion indicated 2 represents the part of the element 1 having the function of a shear tie, and the portion indicated 3 represents the part that has the function of a frame. The term "curved" means that the element 1 is elongate and extends along a curved principle axis S. The element 1 illustrated has an F-shaped, open cross-section. Although this cross-section is preferred from the point of view of the specific application of the element considered, that is, as a structural element of an aircraft fuselage, the present invention is in fact applicable to structural elements with different cross-sections, for example C-shaped or E-shaped cross-sections (see FIG. 10), provided that the cross-section is open.

Figure 2:
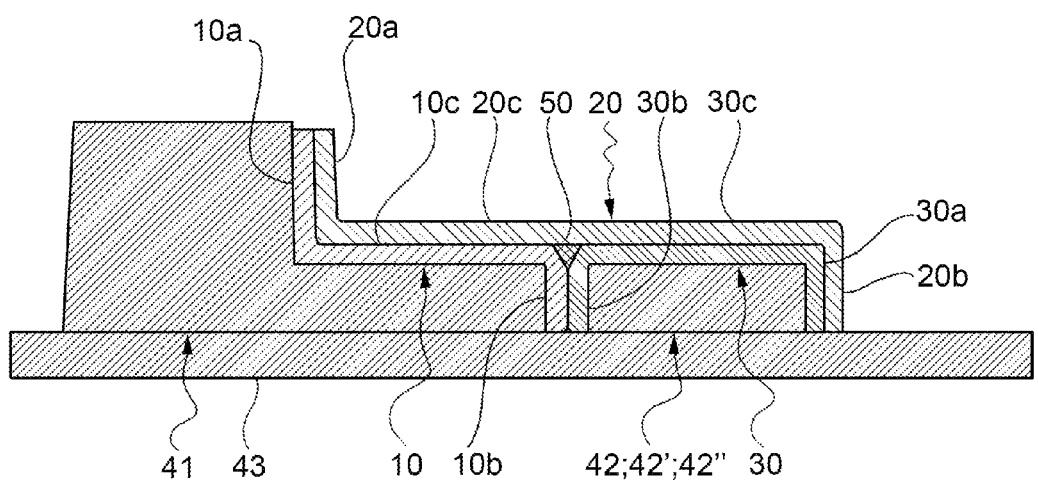
FIG. 2 is a simplified cross-sectional view of a tool on which the components of the element of FIG. 1 are arranged.

As can be seen in FIG. 2, the structural element 1 is formed by the joining together of three components, indicated 10, 20 and 30 in the drawings. The joining methods will be explained in the course of the description.

Each of the components 10, 20 and 30 is constituted by at least one flat layer of curved fibres infused with resin beforehand, combined with at least one pre-impregnated layer with straight fibres.

These components are prepared in accordance with the teaching of International patent application No. PCT/IB2008/052968 by Alenia Aeronautica S.p.A. and Cytec Engineered Materials Ltd., to which reference should be made for a more complete explanation of the process.

However, for descriptive purposes, some characteristics of the method of application No. PCT/IB2008/052968 are described briefly below with specific reference to the components 10, 20 and 30.

1) Each of the components 10, 20 and 30 is produced from a dry preform. The preform has substantially the shape of a flat strip and is arranged so as to be curved in the plane of the strip.
2) The dry preform is constituted by a layer of reinforcing fibres in which a first predefined percentage of the fibres have a curved orientation, that is, substantially parallel to the curved axis of the preform (coinciding with the axis S of the structural element 1), a second predefined percentage of the fibres have a straight arrangement with an orientation inclined at between 0 and +70 degrees to the curved axis, and a third predefined percentage of the fibres have a straight arrangement with an orientation inclined at between 0 and −70 degrees to the curved axis. This arrangement is achieved by a conventional braiding technique. The braiding of the fibres of the three different fractions with different arrangements enables a firm fabric to be obtained in which the fibres do not move because they are braided. The percentage for each orientation is selected on the basis of the load requirements but with constraints resulting from the need to stabilize the orientations of the fibres by means of the braiding. A flat reinforcing layer is thus obtained. Instead of the braiding technique, the reinforcing layer may also be prepared by other conventional techniques such as tow placement and spiral fabric techniques which may be selected according to the structural characteristics to be obtained in the finished curved element 1. The geometrical characteristics (radius of curvature, width in a radial direction, circumferential length) and the physical characteristics (type of reinforcing fibre, weight per unit area of the fibres) are also selected according to the structural characteristics of the finished curved element 1. The curved fibres of the reinforcing layer thus have predefined orientations relative to the curved axis which are established at the stage of the production of the reinforcing layer and are dependent on the desired characteristics of the finished element 1.
3) The dry, flat reinforcing layer thus obtained is combined with a resin film. Controlled temperature and pressure are then applied to bring about the infusion, i.e. penetration, of the resin into the reinforcing layer and to obtain a layer of pre-infused material.
4) The method of producing each of the components 10, 20 and 30 then provides for the preparation of one or more prepreg layers which are formed by straight fibres impregnated with resin compatible with the resin of the pre-infused material, for use mainly to introduce angular orientations greater than 70 degrees into the laminate and/or to produce local increases in thickness. The term "prepreg" means, in conventional manner, a semi-finished product comprising straight reinforcing fibres and a resin matrix in which the fibres are immersed. The fibres may be arranged in various configurations, for example, in a unidirectional layer, in two layers having different orientations, or as fabric. The prepregs are generally prepared in tape form and wound in rolls.
5) The method of producing each of the components 10, 20 and 30 then provides for the layer/s of pre-infused material and the prepreg layer/s to be superimposed on one another in a predetermined arrangement so as to obtain a layered structure. This layering is performed by positioning the layers with the fibre orientations required by the design, in accordance with the design of the finished component.

The application of the above-described characteristics 1)-5) of the method described in application No. TO2007A000557 to the present invention thus produces as starting "material" the three curved components 10, 20 and 30 in flat and "fresh" form, that is in which the resin matrix of the material of which they are made is not yet polymerized.

According to the method of the present invention, an operation for the hot-forming of the raw components 10, 20 and 30 is then performed. The hot-forming takes place by a process in which the material is heated to a temperature which does not activate polymerization and simultaneously applying a vacuum by means of a forming membrane. This known process is called "hot drape forming". An example of the implementation of this process is illustrated in FIGS. 3a-3e and 4a-4b. FIGS. 3a-3e show the stages of the process for the hot-forming of the components 10, 20, upon completion of which an open, Z-shaped cross-section is conferred on the components 10, 20.

A forming tool which can be dismantled and which comprises three forming elements 31, 32 and 33 is used for this purpose. In a first forming stage, shown in FIG. 3a, the flat component 10 or 20 is placed on a tool formed by the combination of the forming elements 31 and 32, hereinafter referred to as the first and second forming elements, which are joined together by releasable joining means 34. The component 10, 20 is arranged in a manner such that a lateral portion 10a, 20a thereof projects laterally from the tool 31, 32 on the side remote from the second forming element 32. In the region of the lateral portion 10a, 20a of the component 10, 20, the first forming element 31 has a rounded edge 31a.

Figure 3A:
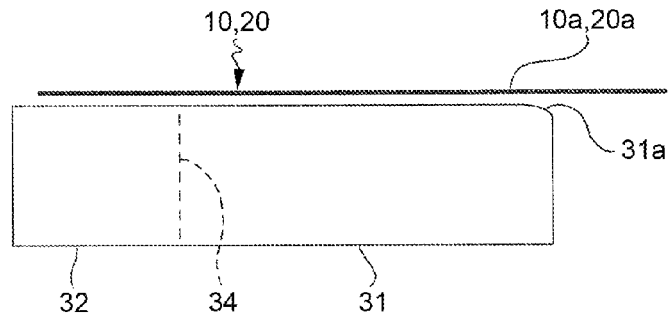
FIGS. 3a-3e are simplified front elevational views showing various stages of a step for the hot-forming of a component of the element of FIG. 1 within the scope of a method of manufacture according to the present invention.
Figure 3B:
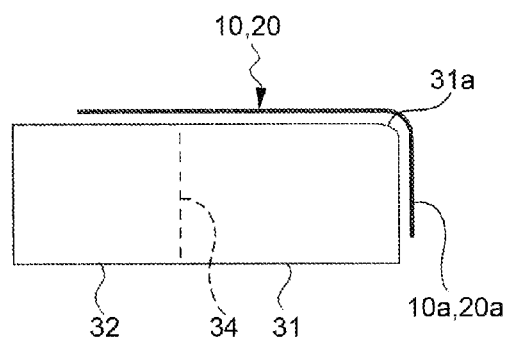

In a second forming stage, shown in FIG. 3b, the flat component 10 or 20 is bent around the rounded edge 31a of the first forming element 31 so that the lateral portion forms a first flange 10a, 20a of the component 10, 20. This takes place, as indicated above, by the application of heat and vacuum by means of a forming membrane (not shown).

Figure 3C:
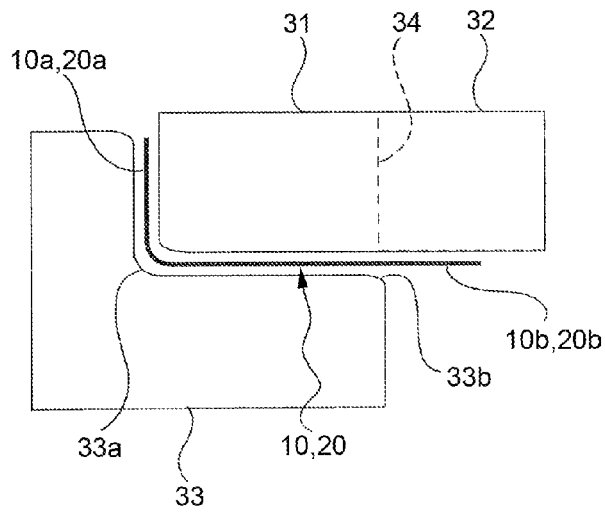

In a third forming stage, shown in FIG. 3c, the tool formed by the first and second forming elements 31, 32 is turned over and positioned in a coordinated manner on the forming element 33, hereinafter referred to as the third forming element. The third forming element 33 has a stepped profile comprising a step fillet 33a with a curvature complementary to the curvature of the rounded edge 31a of the first forming element 31. The tool formed by the first and second forming elements 31, 32 is positioned in a manner such that the bend line of the component 10, 20 lies on the step fillet 33a. The component 10, 20 is arranged in a manner such that a lateral portion 10b, 20b thereof remote from the flange 10a, 20a projects laterally from the third forming element 33 on the side remote from the step junction 33a. Moreover the second forming element 32 also projects laterally relative to the third forming element 33. In the region of the lateral portion 10b, 20b of the component 10, 20, the third forming element 33 has a rounded edge 33b.

Figure 3D:
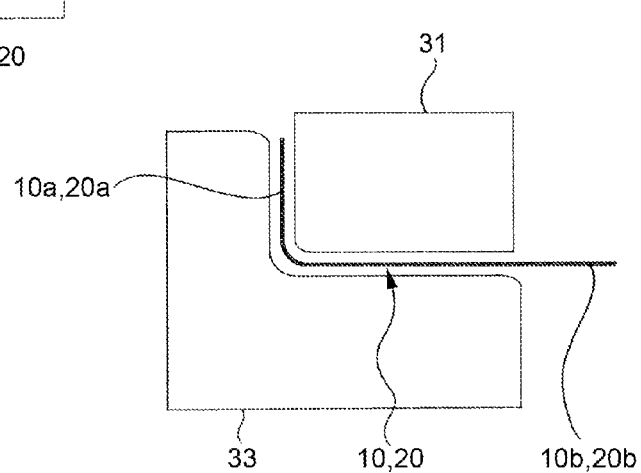

In a fourth forming stage, shown in FIG. 3d, the second forming element 32 is removed from the first forming element 31, thus leaving the lateral portion 10b, 20b of the component 10, 20 exposed at the top.

Figure 3E:
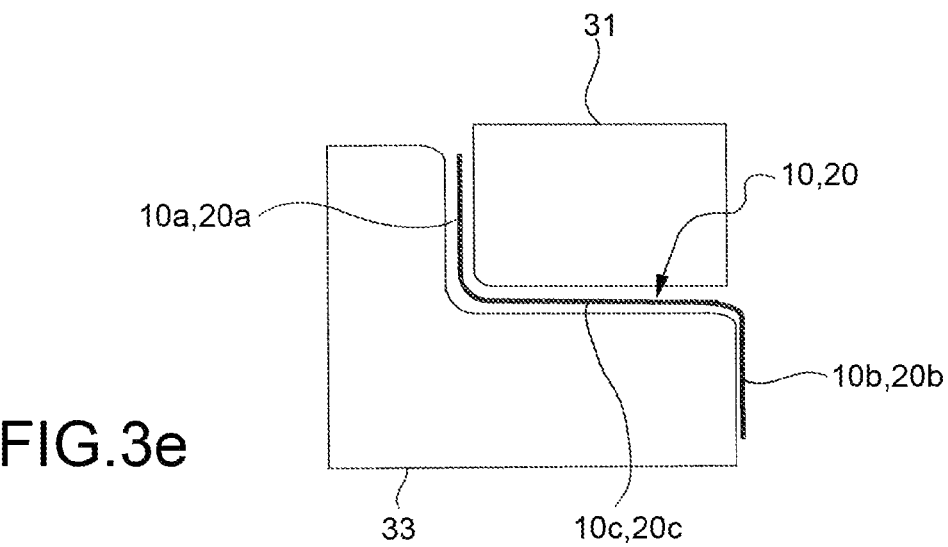

In a fifth forming stage, shown in FIG. 3e, the component 10, 20 is bent around the rounded edge 33b of the third forming element 33 in a manner such that the lateral portion forms a second flange 10b, 20b of the component 10, 20. This takes place, as indicated above, by the application of heat and vacuum by means of a forming membrane (not shown). A shaped, fresh component 10, 20 with a Z-shaped cross-section, having a web 10c, 20c which interconnects the flanges 10a, 10b, 20a, 20b, is thus obtained.

Figure 4A:
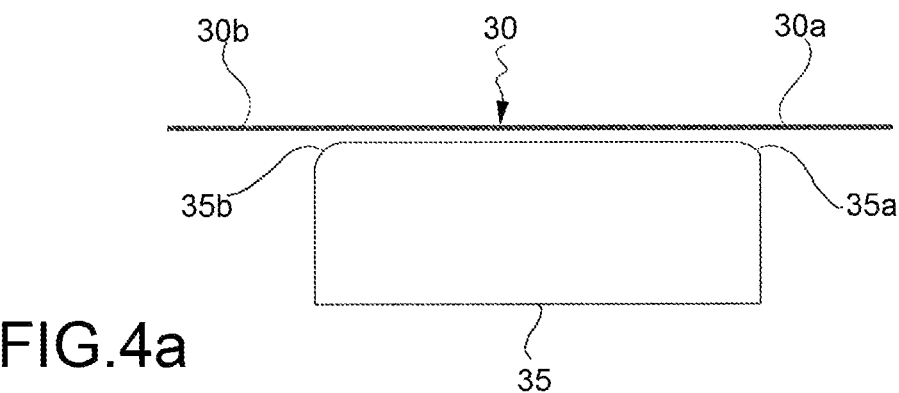
FIGS. 4a-4b are simplified front elevational views showing various stages of a step for the hot-forming of another component of the element of FIG. 1, FIGS. 5 and 6 are a simplified perspective view and a simplified front elevational view, respectively, of the assembly of FIG. 2, complete with vacuum bag.
Figure 4B:
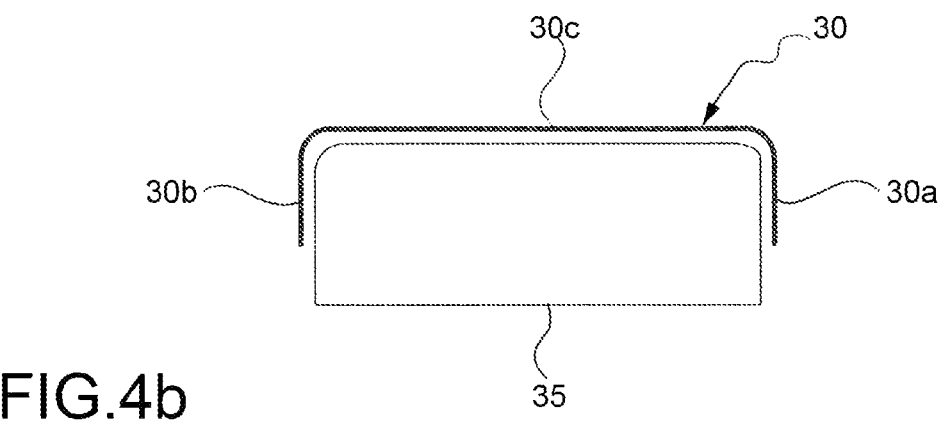

FIGS. 4a-4b show the stages of the process for the hot-forming of the component 30 upon completion of which a shape with an open, C-shaped cross-section is conferred on the component 30.

A forming tool 35 is used for this purpose. In a first forming stage shown in FIG. 4a, the flat component 30 is placed on the forming tool 35. The component 30 is arranged in a manner such that its lateral portions 30a, 30b project laterally from the tool 35 on opposite sides of the component 30. In the region of the lateral portions 30a, 30b of the component 30, the forming tool 35 has respective rounded edges 35a, 35b.

In a second forming stage, shown in FIG. 3b, the flat component 30 is bent around the rounded edges 35a, 35b of the forming tool 35 in a manner such that the lateral portions form respective flanges 30a, 30b of the component 30. This takes place, as indicated above, by the application of heat and vacuum by means of a forming membrane (not shown). A fresh and shaped component 30 with a C-shaped cross-section having a web 30c which interconnects the flanges 30a, 30b is thus obtained.

Upon completion of the hot-forming step, the C-shaped component 30 and the two Z-shaped components 10, 20 shown in FIG. 2 are thus obtained. The forming step described above is thus programmed specifically for the example of the structural element 1 that is considered herein. More generally, according to the type of structural element 1 to be produced and the number of components of the element, several C-sectioned components may be produced. If the design of the curved structural element also requires the provision of reinforcing components to be arranged locally in flat regions of the structural element, these specific components will not need any preparatory forming prior to the final assembly of the components.

The method according to the invention then provides for the deposition and assembly of the hot-formed, fresh components 10, 20, 30 on a polymerization tool, shown in FIGS. 2 and 5 to 8. This tool comprises first and second tool elements 41, 42; 42', which are supported by a platform 43.

The first tool element 41 has a stepped profile and, as can be seen in FIG. 5, is also curved. This first tool element 41 is made of rigid material, for example, Invar or Carboresin.

The second tool element 42; 42', on the other hand, is an inflatable device. Some embodiments of this inflatable device are described below and are indicated by different reference numerals 42, 42', 42".

A first embodiment of the inflatable device is constituted by a semi-rigid device that can be used for a plurality of autoclave cycles.

Figure 7:
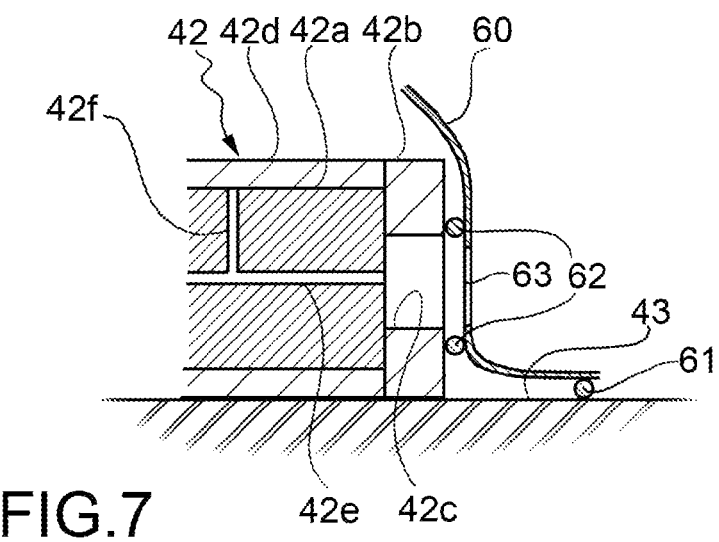

According to a first constructional option illustrated in FIG. 7 and indicated 42, the semi-rigid device is constituted by a rigid inner form element 42a on which a rubber layer 42d capable of withstanding the autoclave pressure and temperature is fitted. Air ducts are created in the form element 42a. In particular, a longitudinal duct 42e extends longitudinally from one end of the form element 42a to the other and a transverse duct 42f extends transversely from the longitudinal duct 42e to the lateral surface of the form element 42a.

Figure 6:
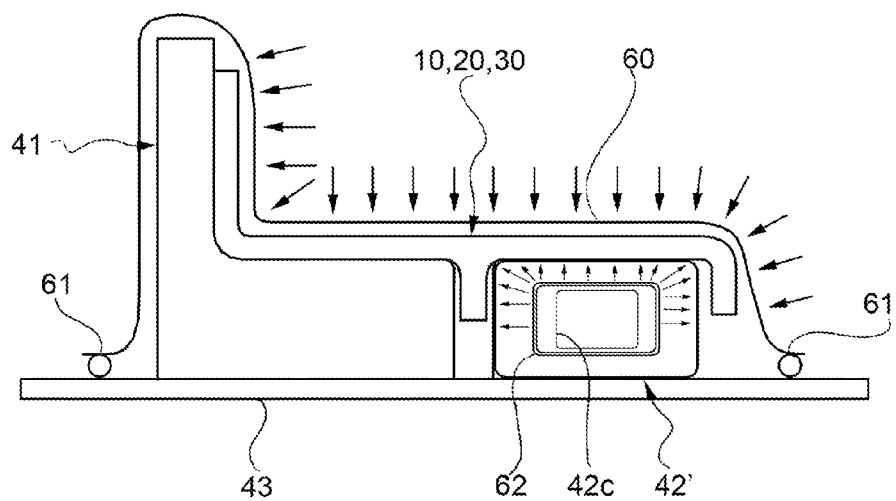
Figure 8:
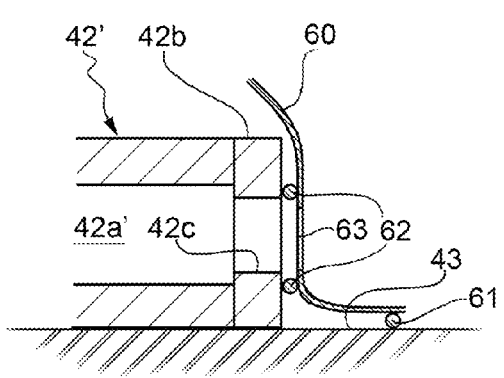
FIGS. 7 to 9 are simplified longitudinal sections through a portion of a tooling element according to various embodiments and variants of that element.

An alternative, shown in FIGS. 5, 6 and 8 and indicated 42', provides for the semi-rigid device to be constituted by an adequate thickness of rubber such as to ensure a sufficiently precise shape so as to form a tubular rubber element in which a cavity 42a' is defined.

In both cases, the semi-rigid device 42; 42' is closed at its two ends by respective end closure elements 42b, one of which can be seen more clearly in FIGS. 7 and 8. The end elements are glued to the rubber of the semi-rigid device 42; 42' to ensure leaktightness at the autoclave pressure and temperature. As can be seen in FIGS. 7 and 8, at one end of the semi-rigid device 42; 42', the respective end element 42b is made of material suitable for the application and removal of sealant which is required for preparing a vacuum bag by the methods which will be described below, and has an opening 42c for enabling the semi-rigid device 42; 42' to be inflated to the autoclave pressure when the whole assembly is under the bag prepared as described below.

Figure 9:
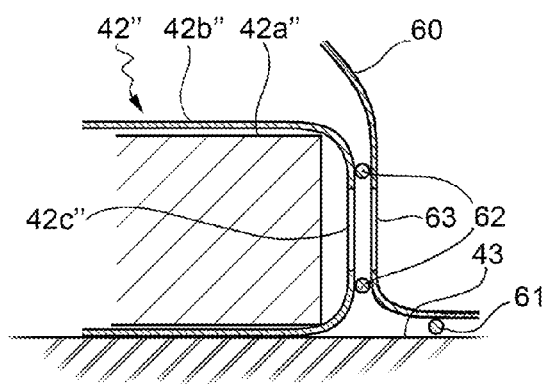

A second embodiment of the second, inflatable element of the tool device, shown in FIG. 9 and indicated 42", is constituted by a reusable, rigid device and by a tubular nylon bag to be changed upon each autoclave cycle.

In this case the inflatable element is constituted by a rigid support 42a" which defines the shape of the second tool element 42" and onto which a tubular nylon bag 42b" with a cross-section having a perimeter greater than the perimeter of the support 42a" is fitted. The tubular bag is fitted onto the rigid support 42a" and the excess material is collected into one or more folds which are positioned on the regions which will not be in contact with the component to be produced.

The bag 42b" is prepared prior to the placing of the fresh component 30 on the tool element 42". A conventional breather fabric (not shown) is positioned over the nylon bag 42b". A layer of release film (not shown), closed longitudinally by adhesive tape, is then positioned over the whole assembly. The excess material is again collected into folds to be positioned in the regions which are not in contact with the component. The release film which has been rendered tubular is then sealed at both ends. The vacuum is then applied to one end by means of a conventional valve, to cause all of the materials (release film, breather fabric, and tubular bag 42b") to adhere to the walls of the rigid support 42a" to produce an inflatable assembly with dimensions that are sufficiently precise to receive the component 30 to be polymerized which is already formed but not polymerized.

A sequence for the assembly of the components 10, 20 and 30 is now described.

The first, Z-shaped component 10 is positioned on the first tool element 41 which is already positioned on the platform 43.

The C-shaped component 20 is then positioned astride the second tool element 42; 42'; 42". The latter is then arranged on the platform 43 in a coordinated position relative to the tool element 41 so that a flange 10b of the first, Z-shaped component 10 fits closely against a flange 30b of the C-shaped component 30.

A triangular-sectioned filler strip 50 of known type is then fitted between the first, Z-shaped component 10 and the second, C-shaped component 30 in the region of their bend lines.

The second Z-shaped component 20 is then positioned over the C-shaped component 30 and the first Z-shaped component 10 so that the web 20c of the second Z-sectioned component 20 fits closely partially against the web 10c of the first Z-sectioned component 10 and partially against the web 30c of the C-sectioned component 30 and in a manner such that a first flange 20a of the second Z-sectioned component 20 fits closely against the free flange 10a of the first Z-sectioned component 10 and a second flange 20b of the second Z-sectioned component 20 fits closely against the free flange 30a of the C-sectioned component 30.

A vacuum bag is then prepared for the raw assembly thus obtained.

For this purpose, the assembly is covered with release film (not shown) and a breather fabric (not shown) is positioned over the film.

Finally, the nylon film 60 which forms the vacuum bag (visible in FIGS. 6 to 8) is put in place. The nylon film 60 covers the entire tool 41, 42; 42'; 42" and is sealed, 61, along the edges of the platform 43 supporting the tool. In addition, a sealing frame 62 is positioned on one end (the end which is arranged for sealing) of the inflatable device 42; 42; 42". The bag film 60 is then also sealed against the end of the inflatable device 42; 42; 42" as shown in FIGS. 7 to 9. In the embodiment of FIG. 7, the sealing frame 62 is fitted around the end opening 42c of the inflatable device 42. If an opening 63 is formed in the nylon film 60 (and positioned inside the frame 62 for sealing against the end of the inflatable device 42), the ducts 42e and 42f, and hence the space between the lateral surface of the form element 42a and the rubber layer 42d of the inflatable device, will thus be in flow communication with the exterior whereas the envelope created by the vacuum bag 60 will remain isolated. The autoclave pressure will thus be able to penetrate into the inflatable device 42 but not beneath the envelope created by the vacuum bag 60. In the embodiment of FIG. 8, the sealing frame 62 is fitted around the end opening 42c of the inflatable device 42'. If an opening 63 is formed in the nylon film 60 (and positioned inside the frame 62 for sealing against the end of the inflatable device 42'), the cavity 42a' of the inflatable device will thus be in flow communication with the exterior whereas the envelope created by the vacuum bag 60 will remain isolated. The autoclave pressure will thus be able to penetrate into the inflatable device 42' but not beneath the envelope created by the vacuum bag 60. In the embodiment of FIG. 9, the sealing frame 62 is fitted around an opening 42c" formed in one end of the tubular vacuum bag 42b" after the positioning of the fresh components 10-30. If the opening 63 is formed in the nylon film 60 (and positioned within the frame 62 for sealing against the end of the inflatable device 42") the space between the rigid support 42a" and the tubular vacuum bag 42b" of the inflatable device 42" will thus be in flow communication with the exterior whereas the envelope created by the vacuum bag 60 will remain isolated.

Suitable folds allow the nylon film 60 to tighten against the tool without forming bridges or other tensions when the vacuum is applied. Conventional valves (not shown) for the application of the vacuum are then fitted on the bag film 60.

The assembly, provided with the vacuum bag 60, is then placed in an autoclave in order to carry out the compaction and polymerization of the components 10 to 30 by means of a pressure and temperature cycle, and hence the formation of the structural element 1 in a single piece.

In the autoclave, by virtue of the contribution of the pressure exerted by the inflatable device on the inside of the C-shaped component, a uniform pressure is applied to the assembled components 10, 20 and 30, as indicated by the arrows in FIG. 6, and ensures the compaction of the components without risk of voids or porosity.

Figure 10:
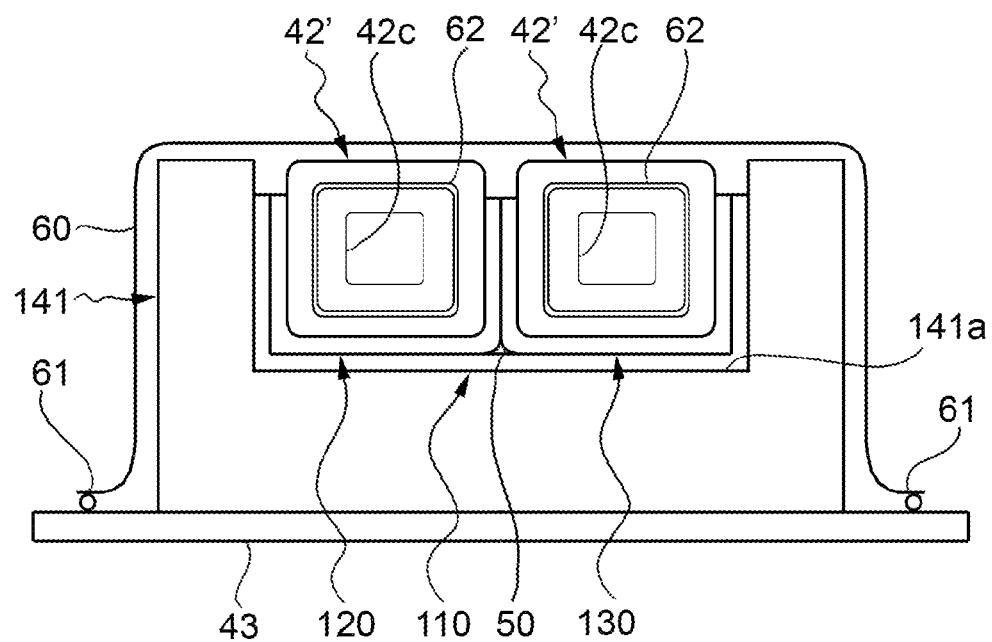
FIG. 10 is a view similar to FIG. 6 of a tool on which components of a curved structural element made of composite material and having a cross-section different from that of FIG. 1 are arranged.

The method according to the invention, applied to the manufacture of a curved structural element having an E-shaped cross-section, will now be described briefly with reference to FIG. 10.

In a similar manner to that described above, this method provides for the preparation of three fresh, flat components 110, 120, 130 each constituted by at least one flat layer of curved fibres previously infused with resin, combined with at least one pre-impregnated layer with straight fibres.

As for the preceding method, hot-forming of the flat raw components is provided for so as to confer the respective open-sectioned shape thereon. In contrast with the preceding method, a C-shaped cross-section is imparted to all three components.

As for the preceding method, the hot-formed raw components are assembled in accordance with a predetermined sequence on a polymerization tool 141, 42' in which the tool comprises at least one shaped, inflatable device 42; in particular, the tool comprises two inflatable devices 42' configured in accordance with one of the embodiments indicated above. In contrast with the preceding method, the polymerization tool comprises, as a first, rigid and curved tool element 141, a female element with a recess 141a for receiving the components 110, 120, 130.

The sequence for the assembly of the components 110, 120 and 130 is therefore as follows.

The first C-shaped component 110 is positioned on the first tool element 141 which is already positioned on the platform 43.

The second and third C-shaped components 120, 130 are then positioned astride the respective second and third tool elements 42'. The second and third tool elements 42' are then turned over and arranged side by side within the recess 141a of the first tool element 141 in a position coordinated therewith so that the webs of the second and third components 120, 130 fit closely against the web of the first component 110 and each flange of each of the three components 110, 120, 130 fits closely against a flange of one of the other two components.

Prior to the assembly of the components 110, 120, 130, a triangular-sectioned filler strip 50 of known type is fitted between the second component 120 and the third component 130 in the region of their bend lines.

As in the preceding method, the raw components 110, 120, 130 assembled on the tool 141, 42' are subjected to a polymerization cycle in an autoclave to produce the E-sectioned structural element. When the element is used as a frame/shear-tie combination in the aeronautical field, the female tool 141 permits the necessary control of the coupling surface on the fuselage side, as was the case for the Z-sectioned element, by virtue of the use of the stepped tool element 41.

Although a vacuum bag is used for the polymerization of the structural element in the methods described, in fact other

The invention claimed is:

1. A method of manufacturing a curved structural element made of composite material and having a complex, open cross-section, in which the structural element is formed by the assembly of a plurality of components made of composite material, comprising the following steps:
preparing three distinct flat components, each component having at least one flat layer of curved fibres previously infused with resin, combined with at least one pre-impregnated layer with straight fibres,
hot-forming the flat components to confer respective open-sectioned shapes thereon, wherein one of the components formed has a C-shaped cross-section, and an open, Z-shaped cross-section is conferred on the other two components;
assembling the hot-formed components in a predetermined sequence on a polymerization tool, the tool comprising at least one shaped, inflatable device astride which the component with a C-shaped cross-section is deposited, and one of the Z-shaped cross section components is deposited directly on a rigid tool element having a corresponding shape and the other of the Z-shaped cross section components is superimposed thereon, the components being assembled such that a flange of the Z-shaped cross section component on the rigid tool fits closely against a flange of the C-shaped cross section component on the inflatable device wherein a web of the superimposed Z-shaped cross section component fits closely partially against a web of the Z-shaped cross section component on the rigid tool element and partially against a web of the C-shaped cross section component, a first flange of the superimposed Z-shaped cross section component fits closely against the free flange of the Z-shaped cross section component on the rigid tool element, and a second flange of the superimposed Z-shaped cross section component fits closely against the free flange of the C-shaped cross section component and
subjecting the components assembled on the tool to a polymerization cycle in an autoclave in which the inflatable device is inflated by the pressure produced in the autoclave to apply a predetermined pressure from the inside of the C-sectioned components fitted thereon.

2. A method according to claim 1 in which the inflatable device is a re-usable, semi-rigid device.

3. A method according to claim 2 in which the inflatable device comprises by a rigid internal form element on which a layer of rubber is fitted, there being created in the form element a longitudinal duct extending longitudinally from one end of the form element to the other end and a transverse duct extending transversely from the longitudinal duct to the lateral surface of the form element so that the longitudinal duct and the transverse duct connect the space between the rubber layer and the lateral surface of the form element with the environment of the autoclave in a leaktight manner.

4. A method according to claim 2 in which the inflatable device is comprises an elastomeric, tubular element defining in its interior a cavity that can be connected with the environment of the autoclave in a leaktight manner.

5. A method according to claim 1 in which the inflatable device comprises a re-usable, rigid support defining the shape of the inflatable device and by a disposable tubular bag which is fitted onto the rigid support and can be connected with the environment of the autoclave in a leaktight manner.

6. A method according to claim 1 in which the curved structural element is an integral frame/shear-tie assembly for an aircraft fuselage.

7. A method of manufacturing a curved structural element made of composite material and having a complex, open cross-section, in which the structural element is formed by the assembly of a plurality of components made of composite material, comprising the following steps:
preparing three distinct flat components, each component having at least one flat layer of curved fibres previously infused with resin, combined with at least one pre-impregnated layer with straight fibres;
hot-forming the flat components to confer a shape with an open C-shaped cross-section on all three components, and
assembling the hot-formed components in a predetermined sequence on a polymerization tool, wherein a first of the components is deposited directly on a rigid, female tool element having a recess and the other two components, which are arranged astride respective inflatable devices, are superimposed on the first of the components after the other two components have been turned over, the components being assembled in a manner such that webs of the other two components fit closely against a web of the first component wherein each flange of each of the three components fits closely against a flange of one of the other two components; and
subjecting the components assembled on the tool to a polymerization cycle in an autoclave in which the inflatable devices are inflated by pressure produced in the autoclave to apply a predetermined pressure from the inside of the C-sectioned components fitted thereon.

* * * * *